(12) United States Patent
Gryan et al.

(10) Patent No.: US 8,768,734 B2
(45) Date of Patent: Jul. 1, 2014

(54) SYSTEM AND METHOD FOR COMPUTING AND SORTING TRIP SIMILARITIES USING GEO-SPATIAL INFORMATION

(75) Inventors: Gary P. Gryan, Arlington, MA (US); Mark S. Coleman, Arlington, MA (US); Darrel S. Barbato, Ashland, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/468,349

(22) Filed: May 10, 2012

(65) Prior Publication Data
US 2013/0304515 A1 Nov. 14, 2013

(51) Int. Cl.
*G06Q 40/00* (2012.01)
(52) U.S. Cl.
USPC .................................................. 705/4
(58) Field of Classification Search
USPC .................................................. 705/4
See application file for complete search history.

(56) References Cited

U.S. PATENT DOCUMENTS

| | | | |
|---|---|---|---|
| 6,502,020 B2 | 12/2002 | Lang | |
| 6,957,142 B2 | 10/2005 | Entenmann | |
| 2007/0282638 A1 | 12/2007 | Surovy | |
| 2010/0030586 A1* | 2/2010 | Taylor et al. | 705/4 |
| 2010/0063850 A1 | 3/2010 | Daniel | |
| 2010/0205012 A1 | 8/2010 | McClellan | |
| 2011/0112717 A1 | 5/2011 | Resner | |
| 2011/0137684 A1* | 6/2011 | Peak et al. | 705/4 |
| 2011/0161116 A1* | 6/2011 | Peak et al. | 705/4 |
| 2011/0202225 A1 | 8/2011 | Willis et al. | |
| 2011/0202305 A1 | 8/2011 | Willis et al. | |

* cited by examiner

*Primary Examiner* — James A Vezeris
*Assistant Examiner* — Liz P Nguyen
(74) *Attorney, Agent, or Firm* — Howard IP Law Group, PC

(57) ABSTRACT

Systems and methods are disclosed herein for pricing an insurance premium based on a vehicle trip similarity score. The system includes a computer memory and a processor in communication with the computer memory. The computer memory stores telematics data received from a sensor within a vehicle. The telematics data includes at least one of geo-position information of the vehicle and vehicle kinematics data. The processor is configured to compute a similarities score based on the telematics data. The processor is also configured to determine a price, price adjustment, or any other benefit for automobile insurance based on the similarities score.

29 Claims, 9 Drawing Sheets

700 →

| TIME | LATITUDES | LONGITUDES | LATITUDES | LONGITUDES |
|---|---|---|---|---|
| 10:20.1 | 41.7636° N | 72.6856° W | 41.7636° N | 72.6856° W |
| 10:20.2 | 41.7637° N | 72.6857° W ⟵ 722 | 41.7637° N | 72.6857° W |
| 10:20.3 | 41.7638° N | 72.6858° W | 41.7638° N | 72.6858° W |
| 10:20.4 | 41.7638° N | 72.6858° W | 41.7639° N | 72.6859° W |
| 10:20.5 | 41.7638° N | 72.6858° W | 41.7640° N | 72.6860° W |
| 10:20.6 | 41.7638° N | 72.6858° W | | |
| 10:20.7 | 41.7639° N | 72.6859° W | | |
| 10:20.8 | 41.7640° N | 72.6860° W | | |

SYSTEM AND METHOD FOR COMPUTING AND SORTING TRIP SIMILARITIES USING GEO-SPATIAL INFORMATION

FIELD OF THE INVENTION

In general, the invention relates to a computerized system and method for determining the price of an insurance premium based on the similarities associated with multiple vehicle trips.

BACKGROUND OF THE INVENTION

The insurance industry has begun exploring the use of telematics sensors and other location-aware devices in motor vehicles as a way of determining driver behavior and, from this, driver risk for the purposes of underwriting, pricing, renewing, and servicing vehicle insurance. The devices can capture very high frequency information on location, speed, vehicle handling, vehicle characteristics, and other factors, which can be used in setting vehicle insurance rates. This rich high frequency data can be used to understand the specific paths or routes a vehicle takes from one destination to another. Note that some drivers might frequently travel along the same routes (e.g., a path between home and work or school) while other drivers rarely travel the same routes. Thus, some drivers might be more familiar with the roads they drive which could impact their potential for accidents as compared to other drivers who are unfamiliar with the roads and might be an important component of evaluating driver risk. For example, a driver might be aware of a particularly tricky intersection or realize that trucks often pull out of a hidden driveway.

SUMMARY

Therefore, there is a need in the art for an accurate and objective measure of trip similarities that may be correlated with a likelihood of accidents and losses. Such a measure may, according to some embodiments, be calculated from location information and/or other vehicle data, such as speed, orientation, and acceleration. Statistical analysis of the data may be used to classify the similarities of multiple trips and/or trip segments. By analyzing the similarities of many trips, an aggregate driving similarities rating for determining driver risk and/or an insurance rate, rate adjustment, or any other benefit for an insurance policy may be calculated.

Accordingly, systems and methods are disclosed herein for pricing an insurance premium based on trip similarities. The system includes a computer memory and a processor in communication with the computer memory. The computer memory stores telematics data received from a sensor within a vehicle. The telematics data includes at least one of geo-position information of the vehicle and vehicle kinematics data. The processor is configured to compute a similarities score for a plurality of trips based on the telematics data. The processor is also configured to determine a price, discount, or any other benefit for automobile insurance for the driver based on the similarities score for a driver or vehicle.

In some embodiments, a retroactive adjustment is applied to a price of an automobile insurance premium for a period during which the telematics data was collected. In other embodiments, a prospective adjustment is applied to a price or other benefit of an automobile insurance premium for a future period. In some embodiments, determining a price, price adjustment, or any other benefit for automobile insurance is associated with a new automobile insurance plan.

According to another aspect, the invention relates to computerized methods for carrying out the functionalities described above. According to another aspect, the invention relates to non-transitory computer readable medium having stored therein instructions for causing a processor to carry out the functionalities described above.

According to another aspect, the invention relates to another system for pricing an insurance premium or otherwise adjusting an insurance policy based on a vehicle trip similarity score. The system includes a computer memory and a processor in communication with the computer memory. The computer memory stores telematics data received from a sensor within a vehicle. The telematics data includes at least one of geo-position information of the vehicle and vehicle kinematics data. The processor is configured to retrieve information related to an automobile insurance policy and receive at least a portion of the stored telematics data from the computer memory. The processor computes a similarities score based on the telematics data and stores the computed similarities score. The processor calculates a price adjustment for a premium or other benefit for the automobile insurance policy based on the retrieved information related to the policy and the similarities score, applies the price adjustment or other benefit to the insurance premium, and outputs the adjusted price for the premium for the automobile insurance policy.

BRIEF DESCRIPTION OF THE DRAWINGS

FIG. 7 illustrates a removal of duplicate entries in a data sequence accordance with some embodiments described herein.

DESCRIPTION OF CERTAIN ILLUSTRATIVE EMBODIMENTS

To provide an overall understanding of the invention, certain illustrative embodiments will now be described, including systems and methods for computing and scoring the similarities of a vehicle trip using geo-spatial information. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
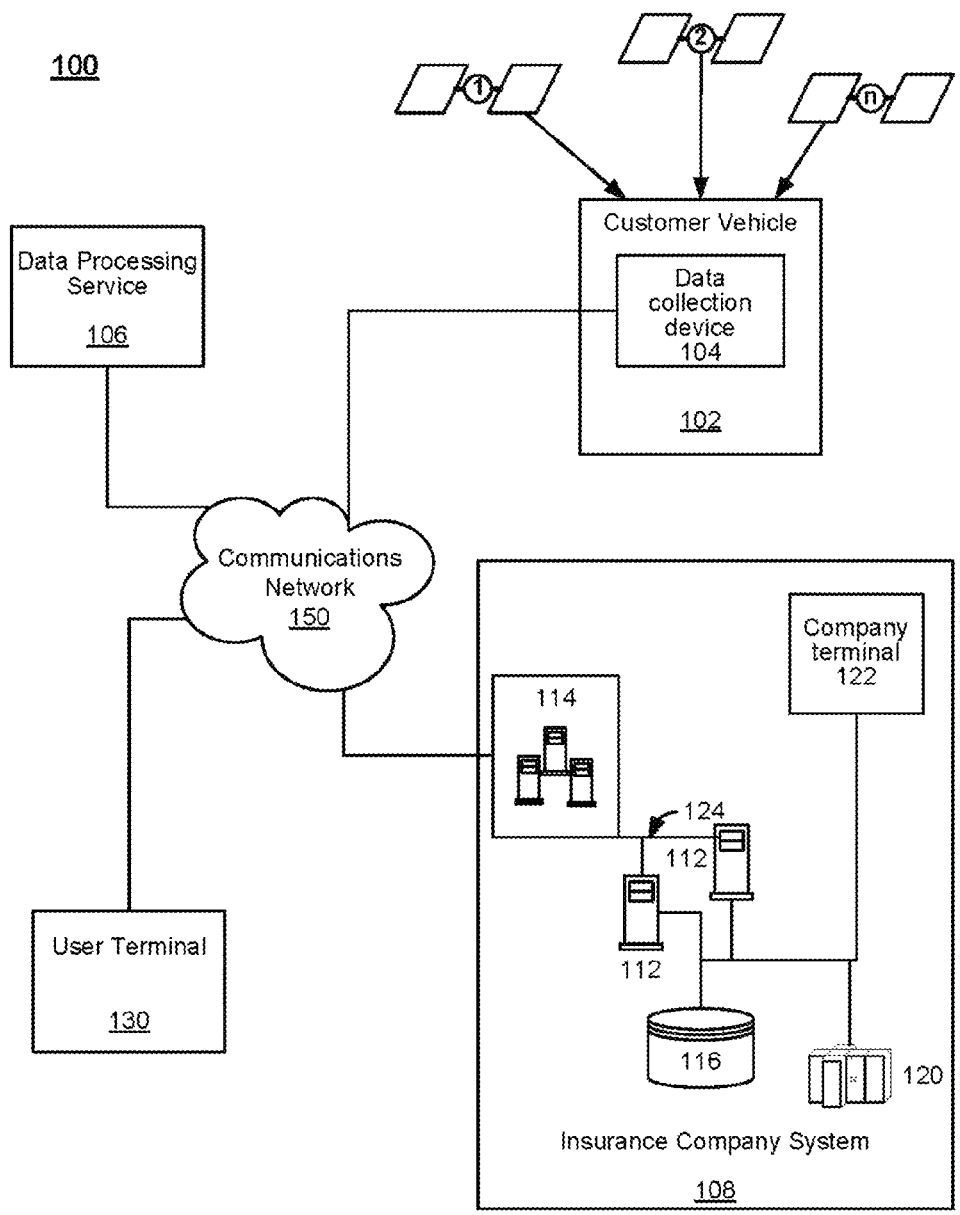
FIG. 1 is an architectural model of a system for setting the price of an insurance premium based on a vehicle trip similarity score, according to an illustrative embodiment of the invention.

FIG. 1 is a block diagram of a system 100 for setting the price of an insurance premium based on a vehicle trip similarity score according to an illustrative embodiment. The system 100 uses data collected along multiple trips traveled by a vehicle to determine the similarities of those trips. An insurance company may use route data, such as Global Positioning Satellite ("GPS") latitude and longitude data, acceleration/deceleration data, speed data, and/or vehicle orientation data collected along a route traveled by the vehicle to determine the similarities of the routes traveled by a vehicle. With a sufficient amount of data, the insurance company can calculate an overall similarities rating describing the similarities of routes taken by the driver and/or the driver's driving habits on the routes. The insurance company can use the similarities rating for setting or adjusting the price of an insurance premium. In some implementations, trip similarity and/or the driver similarity ratings are determined by a third party data processing service. In addition, the insurance premium price may be set by an underwriter, which may be a part of the insurance company or otherwise affiliated with or in a third party arrangement with the insurance company. According to any embodiments described here, similarities ratings may be used to determine a premium price, a premium adjustment, and/or any other benefit that may be associated with an insurance policy (e.g., a decreased deductable value or increased overall coverage amount).

The system 100 includes one or more vehicles 102, each having a data collection device 104. The vehicle 102 may be an automobile, motorcycle, truck, bus, watercraft, aircraft, or any other vehicle operated by a driver. A data collection device 104 is coupled to a vehicle 102 for collecting data about the vehicle's location, movements, or other information that can be used to determine vehicle trip similarity scores. For vehicles with multiple drivers, the data may be associated with the vehicle itself or with the individual drivers. The data collection device 104 may be positioned inside the vehicle 102, attached to the outside of the vehicle 102, or integrated into the vehicle 102. The data collection device 104 is in communication with an insurance company system 108 over a communication network 150. The data collection device 104 may communicate with the insurance company system 108 though a wireless network such as a cellular network or using a wireless Internet connection. In general, the data collection device 104 can be any computing device or plurality of computing devices in cooperation having a data collection sensor (e.g., an antenna or an accelerometer), a processor, a memory, and a means for transmitting the collected data. The customer vehicle 102 or data collection device 104 may include an antenna for receiving signals from Global Navigation Satellite System ("GNSS") satellites, numbered 1 through "n" in FIG. 1. In one implementation, the data collection device 104 is also configured to process the collected data. In some embodiments, the data processing protects the driver's privacy by encrypting the data, removing location information, producing summary information, or taking other measures to reduce the likelihood that location information, speed information, or other sensitive information are received by the insurance company or third parties.

In some embodiments, rather than sending collected data directly to the insurance company system 108, the data collection device 104 sends collected data to a data processing service 106, which processes the data to determine a vehicle trip similarities score and/or an overall similarities rating for a driver that is then sent to the insurance company system 108 for setting an insurance premium price. This can help protect a driver's privacy, since the insurance company does not get detailed data about a driver's location, but only receives summary information. Using a data processing service 106 is in some implementations also preferable to having the data collection device 104 process data to output a vehicle trip similarities score because it reduces the processing power needed by data collection device 104 and because using a third party data processing service 106 may also make it more difficult for drivers to tamper with the data. The data processing service can perform additional monitoring functions, such as vehicle security monitoring or providing location-based alerts (e.g., alerting a parent or employer when a vehicle travels an unusual path) and/or speed alerts. Note that an insurance company might received detailed reports from the third party data processing service 106, summary reports (with certain details removed), and/or supplemented information (e.g., including information from one or more public databases).

The insurance company system 108 includes a plurality of application servers 112, a plurality of load balancing proxy servers 114, an insurance company database 116, a processing unit 120, and company terminal 122. These computing devices are connected by a local area network 124.

The application servers 112 are responsible for interacting with the data collection device 104 and/or the data processing service 106. The data exchange between the insurance company system 108 and data collection device 104 and/or data processing service 106 can utilize push and pull technologies where the application servers 112 of the insurance company system 108 can act as both a server and client for pushing data to the data processing service 106 (e.g., which vehicles to monitor, when to stop data collection, rules for monitoring services requested by the customer) and for pulling data from the data processing service 106. The application servers 112 or other servers of the insurance company system 108 can request to receive periodic data feeds from the data collection device 104 and/or data processing service 106. The communication between the application servers 112 and the data processing service 106 can follow various known communication protocols, such as TCP/IP. Alternatively, the application servers 112 and data processing service 106 can communicate with each other wirelessly, e.g., via cellular communication, Wi-Fi, Wi-Max, or other wireless communications technologies or combination of wired or wireless channels. The load balancing proxy servers 114 operate to distribute the load among application servers 112.

The insurance company database 116 stores information about vehicular insurance policies. For each insurance policy, the database 116 includes for example and without limitation, the following data fields: policy coverage, similarities rating, policy limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer payment history, or derivations thereof. Note that any of the embodiments described herein might be associated with existing insurance policies, newly issued insurance policies, and/or policies that have not yet been issued (e.g., during a trial phase before a policy is issued). According to some embodiments, information collected during a trial period may influence a discount or other benefit that is eventually associated with an insurance policy.

The processing unit 120 is configured for determining the price of an insurance premium based on a similarities rating for a driver or vehicle. The processing unit 120 may comprise multiple separate processors, such as a similarities processor, which calculates a similarities rating from raw or processed data from the data collection device 104 or data processing service 106 over the communications network 150; and a business logic processor, which determines a premium price for a policyholder based on, among other things, the similarities rating. In some embodiments, insurance premium prices or information for making insurance pricing determinations may be generated by a third-party underwriter, which is separate from the insurance company system 108. An exemplary implementation of a computing device for use in the processing unit 120 is discussed in greater detail in relation to FIG. 2.

The company terminals 122 provide various user interfaces to insurance company employees to interact with the processing system 120. The interfaces include, without limitation, interfaces to review similarities data, vehicle trip similarities, and similarities ratings; to retrieve data related to insurance policies; to manually adjust vehicle trip similarities or similarities rating; and to manually adjust premium pricing. In some instances, different users may be given different access privileges. For example, marketing employees may only be able to retrieve information on insurance policies but not make any changes to data. Such interfaces may be integrated into one or more websites for managing the insurance company system 108 presented by the application servers 112, or they may be integrated into thin or thick software clients or stand alone software. The company terminals 122 can be any computing devices suitable for carrying out the processes described above, including personal computers, laptop computers, tablet computers, smartphones, servers, and other computing devices.

The user terminal 130 provides various user interfaces to customers to interact with the insurance company system 108 over the communications network 150. Potential customers can use user terminals 130 to retrieve policy and pricing information for insurance policies offered by the insurance company. Customers can enter information pertaining to changes in their insurance policy, e.g., changes in policy coverage, addition or subtraction of drivers, addition or subtraction of vehicles, relocation, mileage information, etc. Customers can also use the user terminal 130 for a pay-as-you-go insurance policy in which customers purchase insurance by the trip or mile.

In some embodiments, the data collection device 104 may not be continually connected to the insurance company system 108 via the network 150. For example, the data collection device 104 may be configured to temporarily store data if the data collection device 104 becomes disconnected from the network, like when it travels out of range of cellular towers. When the connection is restored, the data collection device 104 can then transmit the temporarily stored data to the insurance company system 108. The data collection device 104 may alternatively be configured to connect to the communications network 150 through a user's home Wi-Fi network. In this case, the data collection device 104 stores trip data until it returns to the vicinity of the user's home, connects to the user's wireless network, and sends the data. In some embodiments, the data collection device 104 is not connected to the network 150 at all, but rather, data collected is transmitted to the insurance company though other means. For example, a customer can receive a data collection device 104 from the insurance company, couple the device 104 to his car for a set period of time or number of miles, and then either mail the device 104 with the collected data to the insurance company system 108 or extract and send the collected data to the insurance company system 108 via mail, email, or though a website.

Figure 2:
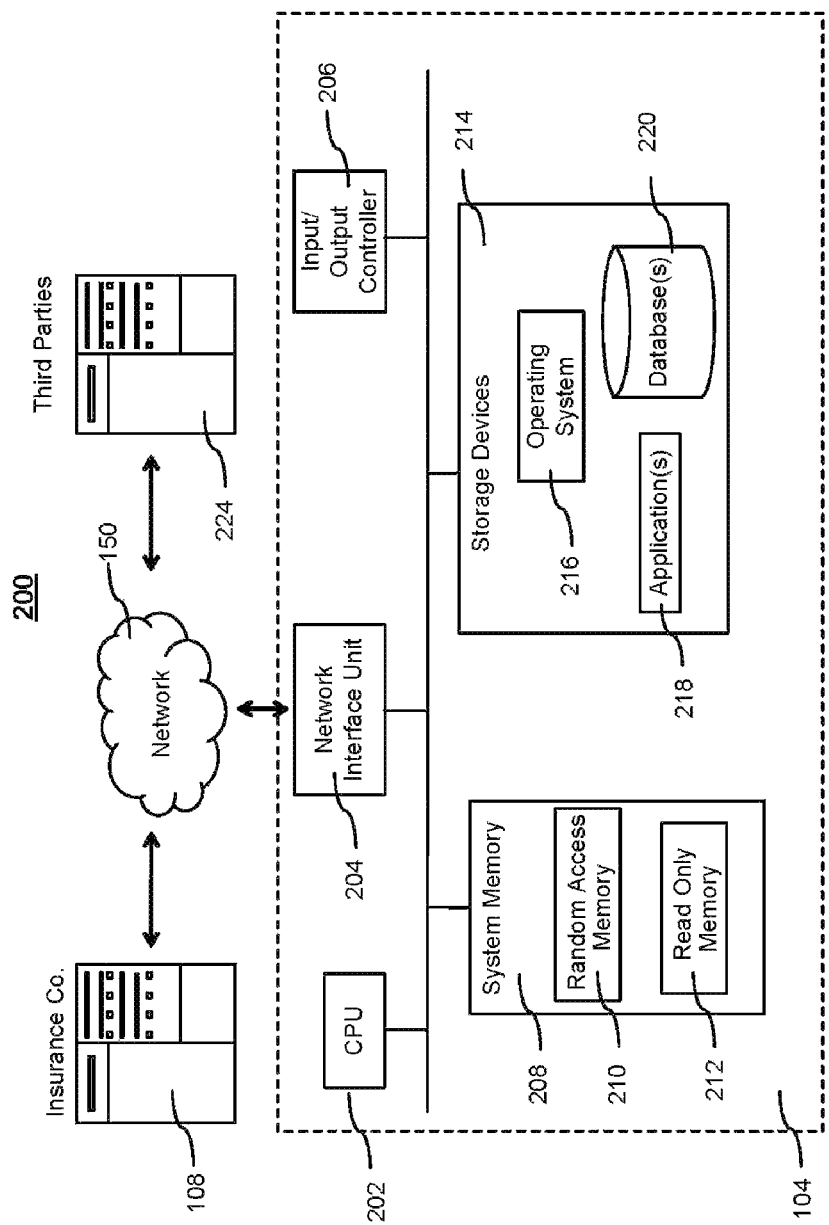
FIG. 2 is a block diagram of a computing system as used in FIG. 1, according to an illustrative embodiment of the invention.

FIG. 2 is a block diagram of a computing device 200 used for carrying out at least one of trip similarities processing and business logic processing described in relation to FIG. 1, according to an illustrative embodiment of the invention. The computing device 200 comprises at least one network interface unit 204, an input/output controller 206, system memory 208, and one or more data storage devices 214. The system memory 208 includes at least one Random Access Memory ("RAM") 210 and at least one Read-Only Memory ("ROM") 212. All of these elements are in communication with a Central Processing Unit ("CPU") 202 to facilitate the operation of the computing device 200. The computing device 200 may be configured in many different ways. For example, the computing device 200 may be a conventional standalone computer or alternatively, the functions of computing device 200 may be distributed across multiple computer systems and architectures. The computing device 200 may be configured to perform some or all of the similarities and business logic processing, or these functions may be distributed across multiple computer systems and architectures. In the embodiment shown in FIG. 1, the computing device 200 is linked, via network 150 or local network 124, to other servers or systems housed by the insurance company system 108, such as the load balancing server 114, and/or the application servers 112.

The computing device 200 may be configured in a distributed architecture, wherein databases and processors are housed in separate units or locations. The computing device 200 may also be implemented as a server located either on site near the insurance company system 108, or it may be accessed remotely by the insurance company system 108. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured for calculating a trip similarities score for a driver or vehicle. The same computing device 200 or another similar computing device may be configured for calculating an aggregate similarities rating based on multiple similarities scores (e.g., associated with different clusters of similar routes). The same computing device 200 or another similar computing device may be configured for calculating an insurance premium for a vehicle based at least the similarities scores and/or the similarities rating.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. The database(s) 220 may including all or a subset of data stored in insurance company database 116, described above with respect to FIG. 1, as well as additional data, such as formulas or manual adjustments, used in establishing the insurance risk for a vehicle.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for scoring trip similarities based on telematics data associated with a plurality of trips taken by a vehicle or driver. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include Dynamic Random Access Memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or Electronically Erasable Programmable Read-Only Memory ("EEPROM"), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
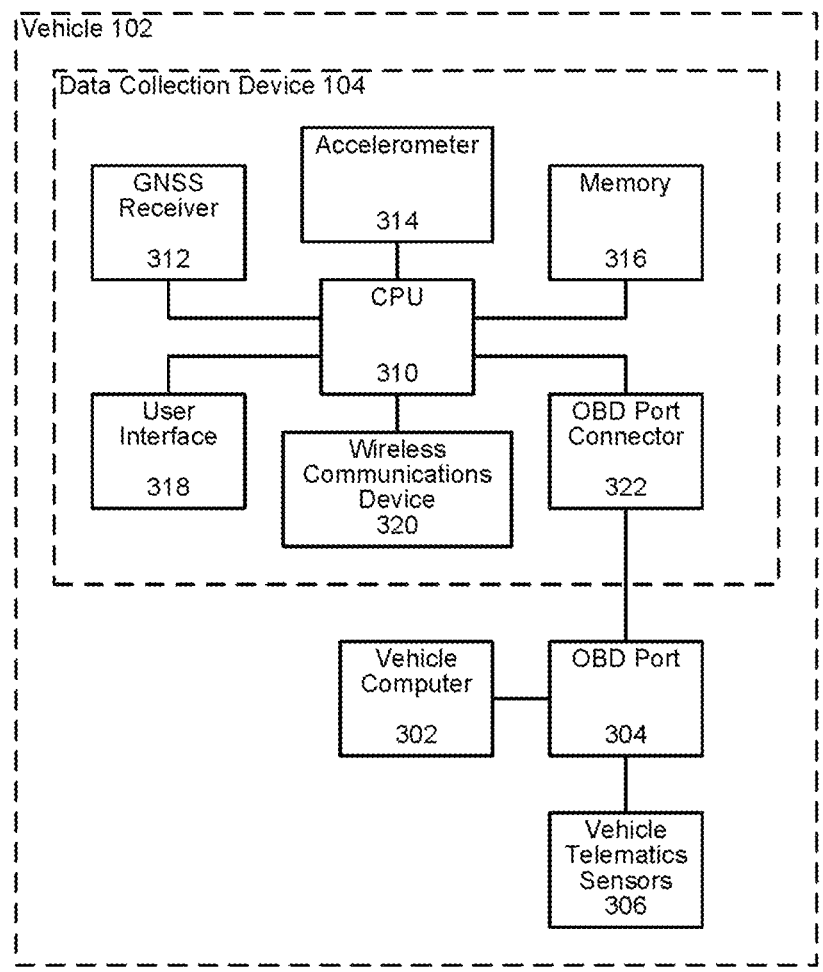
FIG. 3 is a block diagram of a vehicle and a device coupled to the vehicle for collecting data related to vehicle trip similarities, according to an illustrative embodiment of the invention.

FIG. 3 is a block diagram of a vehicle 102 having a data collection device 104. As described with regard to FIG. 1, the vehicle 102 may be an automobile, motorcycle, truck, bus, watercraft, aircraft, or any other vehicle operated by a driver. The vehicle 102 includes a vehicle computer 302, an On-Board Diagnostics ("OBD") port 304, and vehicle telematics sensors 306. The data collection device 104 is connected to the vehicle 102 via an OBD port connector 322 connected to the OBD port 304 to receive telematics data and other information. The data collection device 104 includes a CPU 310, a GNSS receiver 312, an accelerometer 314, memory 316, a user interface 318, and a wireless communications device 320. The CPU 310 is in communication with the other elements of the data collection device 104 to facilitate the operation of the data collection device 104. The CPU can also be configured to process data received from the GNSS receiver 312, the accelerometer 314, and the OBD port connector 322. Data processing may include calculating vehicle trip similarity scores, calculating similarities ratings, calculating intermediate values for determining vehicle trip similarities, or encrypting data sent by the wireless communications device 320.

The Global Navigation Satellite System ("GNSS") receiver 312 includes an antenna and associated signal processing circuitry for receiving signals from GNSS satellites, such as the satellites numbered 1 through n in FIG. 1, and determining its location from the signals. GNSS satellites may be, for example, GPS, GLONASS, Galileo, or Beidou satellites which send time and orbital data from which the data collection device 104 can calculate its location. In some configurations, the CPU 310 calculates the location of the vehicle from data from the receiver 312. The CPU 310 can pull location data from the GNSS receiver 312 at set time intervals, such as every 0.1 seconds, 0.2 seconds, 0.5 seconds, 1 second, 2 seconds, 5 seconds, or 10 seconds. The CPU 310 sends the location data to the memory 316 along with a time and date stamp indicating when the vehicle was at the location. In some embodiments, the GNSS receiver 312 may be part of a separate GNSS device used by the driver for obtaining driving directions. In this case, the GNSS receiver 312 transmits data to the data collection device 104 though a wired connection or a wireless connection, e.g., BLUETOOTH or Wi-Fi.

The accelerometer 314 is a device that measures proper acceleration. Data collected from an accelerometer 314 may include or be used for obtaining the g-force, acceleration, orientation, shock, vibration, jerk, velocity, speed, and/or position of the vehicle. Some or all of these types of data are received or calculated by the CPU 310. The CPU 310 may collect data at intervals such as every 0.1 seconds, 0.2 seconds, 0.5 seconds, 1 second, 2 seconds, 5 seconds, or 10 seconds and store the data in the memory 316. Each data point is time and date stamped and/or location stamped. In some embodiments, the CPU 310 determines intervals between data stored in the memory 316 based on trends in the data. The rate of data collection may vary based on vehicle behavior; for example, if a driver is travelling along a straight road at a consistent speed, the CPU 310 may save data less frequently than if the driver is making frequent turns. In some embodiments, only "exception data" evident of safety events or other unusual driving behavior is stored. For example, the CPU 310 may only save accelerations, decelerations, hard turns, speeds, lane change speeds, etc. with rates above a certain threshold.

The OBD port connector 322 is used to collect data from the vehicle computer 302 and/or vehicle telematics sensors 306 via OBD port 304. The vehicle computer 302 may provide information about the vehicle's speed, the number of miles traveled, whether the vehicle is running or not, seatbelt usage, airbag deployment, and vehicle diagnostics. Vehicle diagnostics data can be used to determine whether a safety event was caused by the driver's actions or related to a vehicle malfunction, such as low tire pressure, low oil pressure, high engine temperature, loss of power, and stalling. The vehicle may contain additional telematics sensors 306 for, e.g., vehicle tracking, monitoring gasoline consumption, and vehicle safety. Data obtained by the data collection device 104 from the vehicle computer 302 and telematics sensors 306 via the OBD port 304 can supplement or be used instead of data collected by the GNSS receiver 312 and/or accelerometer 314. In some embodiments, the data collection device 104 turns on automatically when the vehicle is turned on; the data collection device 104 may be powered by the vehicle 102.

The data collection device 104 also includes a wireless communications device 320 for sending collected data to and receiving commands from the data processing service 106 and/or insurance company system 108 via the network 150. The data collection device 104 may also be configured for communication with the driver or a passenger via user interface 318. The user interface 318 includes output components, such as a screen or speakers, and input components, such as a touch screen, keyboard, or microphone. The user interface 318 can output similarities data, route summary data, vehicle diagnostics data, and any data collected from the GNSS receiver 312, accelerometer 314, and/or OBD port 304. In some embodiments, the data collection device 104 is also a navigation device that can calculate and display a route to a destination inputted by the user.

Figure 4:
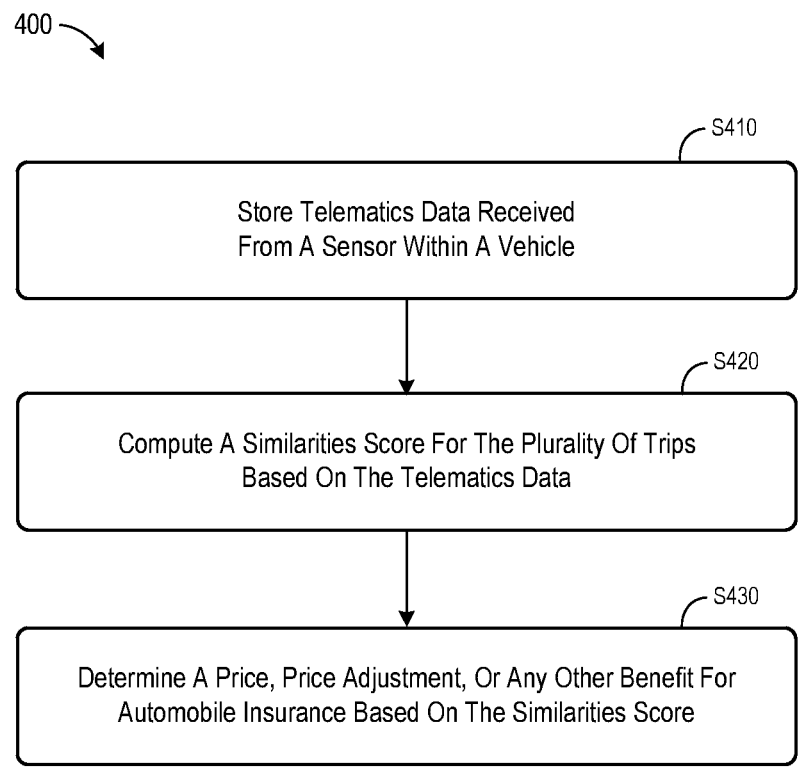
FIG. 4 is a flowchart of a method for determining a similarities rating for a driver or vehicle and computing an insurance premium based on the similarities rating, according to an illustrative embodiment of the invention.

FIG. 4 is a flowchart of a method 400 for determining a similarities rating for a driver or vehicle and computing an insurance premium based on the similarities rating. The method 400 includes the steps of obtaining telematics data for multiple trips (step S410), calculating a similarities rating based that data (step S420), and computing an insurance premium, price adjustment, or any other benefit based on the similarities rating (step S430). The method 400 can be performed by the data collection device 104, the data processing service 106, the insurance company system 108, or any combination of these.

To obtain telematics data for a trip (step S410), data from receivers and sensors such as GNSS receiver 312, accelerometer 314, vehicle computer 302, and vehicle telematics sensors 306 may be collected by the data collection device 104 and stored in the memory 306 of the data collection device 306 and/or sent to the data processing service 106 or insurance company system 108. The telematics data is stored at least by the device or system calculating a similarities rating (step S420). A driver typically uses his vehicle for different types of trips, such as commuting to work, running errands, recreational trips, long-distance travel, etc., which occur on different routes and at different times of the day, and data about these various trips traveled by the driver may be included when pricing the insurance premium.

Once data for a driver or vehicle has been collected, a trip similarities score is calculated (step S420). The trip similarities score may comprise, for example, a signature of driving "route regularity" and a corresponding capability to accurate classify or profile individual drivers by the similarity of the routes that they most frequently travel. For example, many drivers spend the majority of their vehicle travel time commuting to and from their workplace, day after day. Similarly, many drivers use the same route to travel to frequently visited locations—schools, stores, friends' residences, etc.

Figure 5:
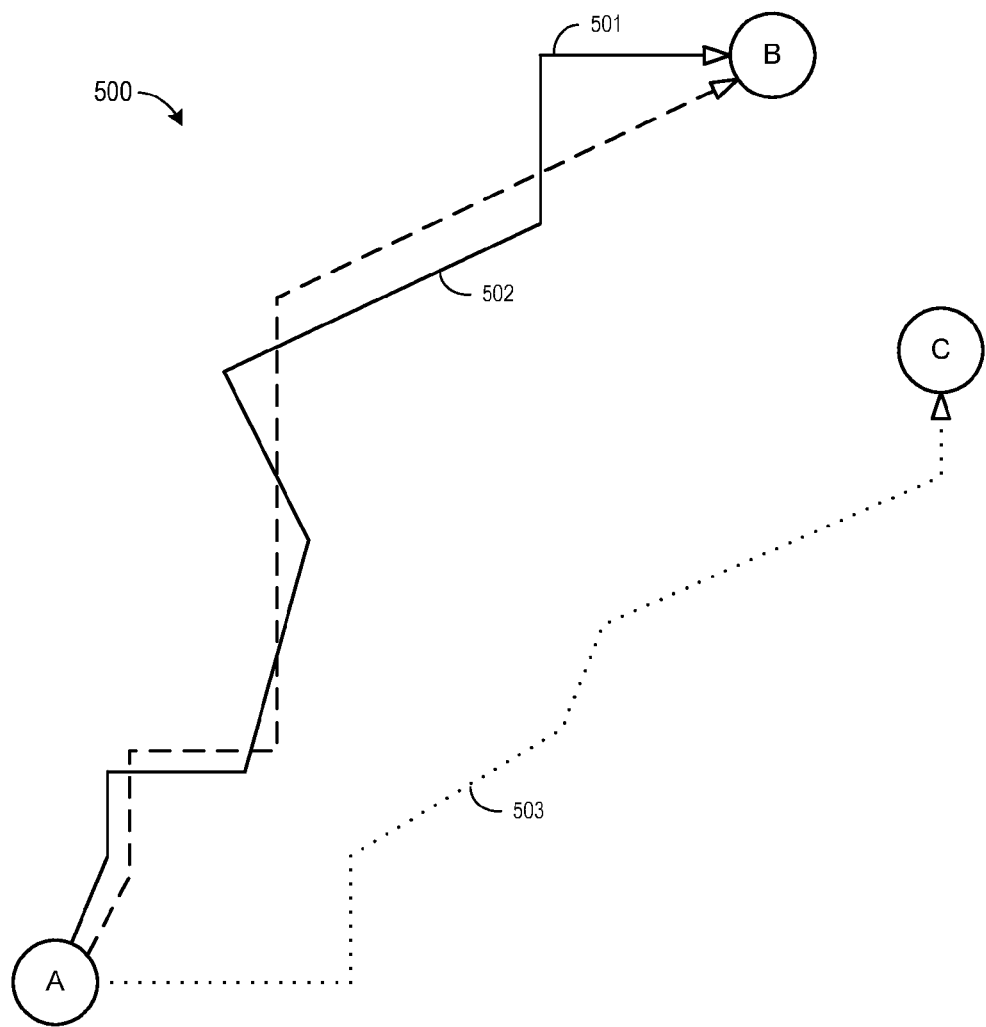
FIG. 5 illustrates multiple vehicle trips in accordance with some embodiments described herein.

Consider, for example, FIG. 5 which illustrates 500 multiple trips 501, 502, 503 between destinations. In particular, a first trip 501 travels a path from an origination "A" to a destination "B" (e.g., with A being identified based on when the vehicle is turned on and B being identified based on when the vehicle is turned off). A second trip 502 travels a slightly different path from A to B. As a result, a comparison of these two trips 501, 502 may result in a similarity score that indicates that the trips 501, 502 are very similar. In contrast, a third trip 503 travels a very different path from A to a different destination "B." In this case, a similarities score comparing the first trip 501 and the third trip 503 would indicate that they are not very similar. According to some embodiments, information about an origination or destination may be used to modify a trip similarity score and/or an associated insurance premium (e.g., when a destination is identified as being a shopping mall parking lot).

It might be the case that familiarity with a route results in a driver who is less likely to get into an accident since road hazards, congestion points, road topography, surface conditions, etc. are known. On the other hand, a driver who knows a route well might tend to drive less cautiously because he or she pays attention less as compared to a driver who is being unusually careful on an unfamiliar road. According to some embodiments, certain types of drivers might see a price increase based on higher similarities scores while other types of drivers see a price decrease based on higher similarities scores. In either case, according to some embodiments, drivers might be profiled and "scored" by quantifying how often they travel the same set of routes on a regular basis. These trip similarity scores might, for example, be used as a predictive factor for determining individual driver risk and the driver's resulting insurance premium. Accurately determining a robust trip similarity score may be a challenging computational task.

According to some embodiments described herein, a classification system may measure an inherent spatial similarity of two or more pairs of trips, expressed as latitude and longitude coordinates, using ideas similar to those used the bioinformatics field, such as in the area of sequence alignment.

Sequence alignment may refer to, for example, a body of techniques developed to objectively compare similarities between sets or lists of biological markers, such as DNA, RNA, and/or protein sequences. For example, given two lists of data (which can be any sort of object, e.g., strings, numerical data, or time series), sequence alignment methods provide a score of how similar one list is to another, by computing the number of element-by-element transformations (e.g., insertions, deletions, and mutations) it would take to convert the first list to the second list. This may, for example, result in a score expressed as an integer. Note that embodiments may be associated with pairwise alignment, multiple sequence alignment, and/or structural alignment methods.

At the extremes, an alignment value of 0 might mean the two lists have no common elements; and larger values may represent a number of common elements in common locations within the respective lists after an alignment algorithm has finished. If two lists of length n have an alignment value of n, this may mean, for example, that the lists are identical. There are several sequence alignment algorithms, including the Needleman-Wunsch method wherein a two-dimensional array is allocated such that different columns hold a series latitude/longitude pairs for each trip and dynamic programming is used in connection with an optimal matching algorithm. More generally, the Smith-Waterman method may perform local sequence alignment to determine similar regions between two series of latitude/longitude pairs.

Figure 6:
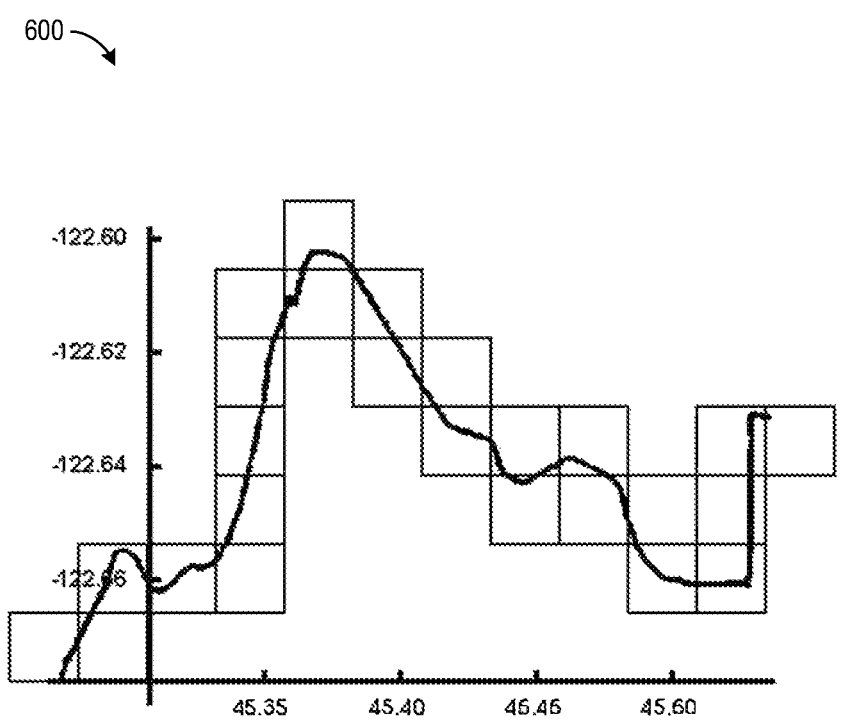
FIG. 6 is a plot of a trip demonstrating an illustrative method for transforming data prior to calculating a vehicle trip similarity score.

To compute trip similarity scores according to some embodiments, a process may collect all of the trips for an individual driver, expressed as sequences of latitude and longitude coordinates, and each individual trip may be ordered by time. According to some embodiments, basic data cleansing and/or transformation techniques may be applied to the raw telematics data. For example, FIG. 6 illustrates a graph 600 wherein particular latitudes and longitudes may be generalized by determining a "box" within which each location falls to simplify calculations. Such an approach may, for example, be performed by applying a rounding operation on latitude and/or longitude values.

Similarly, FIG. 7 illustrates data 700 including an original sequence 710 of latitude/longitude pairs and associated time values. According to some embodiments, runs of duplicate latitude/longitude coordinates 712 may be identified (these might occur when, for example, a vehicle is stopped at a traffic light or is stuck in a traffic jam). The duplicate latitude/longitude coordinates 712 and removed to create an improved sequence 720 that can better be used to calculate a trip similarity score.

A Smith-Waterman score may be computed for each trip as compared to each other trip in a sample for a driver or vehicle to generate multiple trip similarity scores. The process may then be repeated for other trips, drivers, and/or vehicles. According to some embodiments, a family of summary scores may be generated for each driver, e.g., the mean, median, standard deviation, and/or distribution of each drivers' set of scores. Drivers with a higher average Smith-Waterman score may tend to drive similar routes more often as compared to drivers with lower scores. The trip similarity scores may, according to some embodiments, be used to cluster trips together and/or determine how many distinct routes an individual uses.

The trip similarity score may represent a unique, driver-specific factor associated with the actual travel routes taken by that driver across all of their trips in his or her data sample. By itself, such a factor may allow an insurer to rank drivers by their trip similarity score, indentifying those who drive the same routes with the greatest frequency. According to some embodiments, this factor is used as part of a rate-making plans to help determine an individual driver's appropriate insurance premium. According to some embodiments, a similarity score may simply based on location data points (regardless of the time based order of those points) and/or a clustering based on sets of coordinates.

An insurance premium, adjustment, or any other benefit for the vehicle may therefore determined based on the trip similarities score or rating (step 430). A vehicle having a higher aggregate similarities rating typically takes the same route over and over as compared to a vehicle with a lower similarities rating and, therefore, may be more (or less) likely to be in an accident. So, a vehicle that typically travels similar routes may be offered a different insurance premium than the same vehicle with the same owner that typically travels less similar routes. Other factors, such as vehicle type, age, value, and storage location and driver age, driving history, residence, and primary driving locations can be used in setting the insurance premium pricing.

Additional telematics data, such as maximum speed, average speed, driving locations, time of day of travel, vehicle safety, etc. can also be used for setting the insurance premium price. The additional data can be combined with the similarities score to form an overall safety score. In some embodiments, the additional data, particularly vehicle kinematics data (i.e., speed, velocity, acceleration, jerk, etc.) is used to gauge how a driver behaves on different routes. Drivers may respond differently when traveling familiar routes; for example, some drivers make fast accelerations, decelerations, change lanes, and turns more readily than when on unfamiliar routes. As a result, a driver might experiences more safety events and may be more likely to have an accident. More severe safety events, e.g., faster or harder accelerations or decelerations, also increase the likelihood that the vehicle will have an accident. So, the frequency of safety events, as well as the type of safety events and severity of the events, can be used in classifying a driver's driving habits and determining the insurance premium. According to some embodiments, a trip similarity score may be associated with multiple drivers, multiple vehicles, time of day information, day of week information, and/or trip clusters (e.g., a particular driver almost always travels these six paths on weekends). Note that a similarity score might be calculated on an annual basis, on a substantially real-time basis or with any other frequency.

The similarities rating can be used for retroactive, real-time or prospective insurance premium pricing. For retroactive pricing, a customer can pay a preset price for automobile insurance coverage for a period of time, wherein the preset price assumes a certain similarities rating. During the time period or a portion of the time period, the customer's trips are monitored to determine a similarities rating. At the end of the time period, the customer is given a refund or a credit if the customer's actual similarities rating was different than the assumed similarities rating of the preset price. In some embodiments, the customer is instead charged a surcharge. For prospective pricing, the similarities of trips taken by a customer during one time period may be used for determining a price for an automobile insurance premium for a different, later time period. For example, a current or prospective customer could install a data collection device in his car for a period of time and send the data collection device to the insurance company or a third party, which calculates the similarities rating to be used for adjusting future premium prices. The customer or the insurance company may request that a new similarities rating be recalculated using new data when the driver's vehicle trip similarity scores are more likely change, e.g., if the customer moves, changes jobs, has a child, or retires, or at certain time periods, e.g., every year, every two years, every three years, every five years, every ten years, etc. In some embodiments, both prospective pricing and retroactive pricing are used. For example, a customer being continually monitored can be charged a premium for a time period based on one or more past similarities ratings, and if the customer's actual similarities rating for the time period was greater than or less than the expected rating, a refund, credit, or surcharge may be applied as appropriate.

Figure 8:
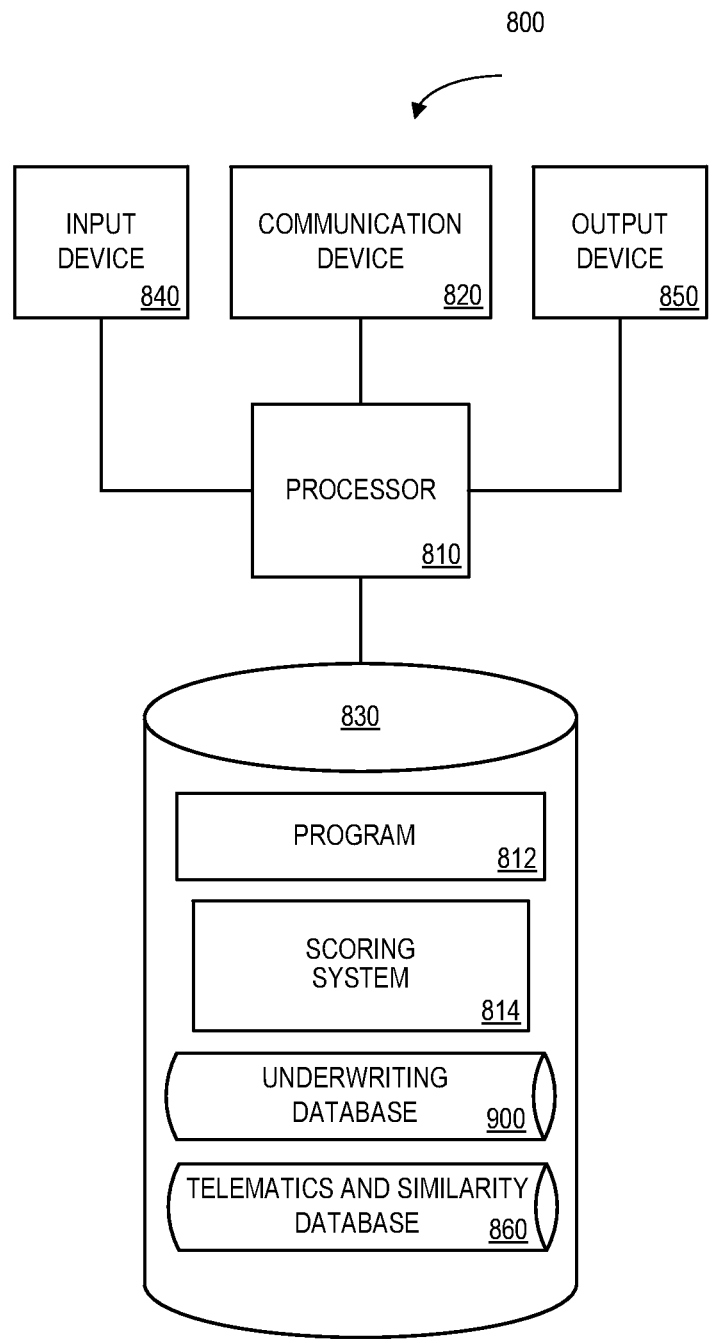
FIG. 8 is a block diagram of a system provided in accordance with some embodiments.

The processes described herein may be performed by any suitable device or apparatus. FIG. 8 is one example of an insurance platform 800 according to some embodiments. The insurance platform 800 may be, for example, associated with the system 90 FIG. 1. The insurance platform 800 comprises a processor 810, such as one or more commercially available CPUs in the form of one-chip microprocessors, coupled to a communication device 820 configured to communicate via a communication network (not shown in FIG. 8). The communication device 820 may be used to communicate, for example, with one or more remote vehicles. The insurance platform 800 further includes an input device 840 (e.g., a mouse and/or keyboard to enter insurance discount information) and an output device 850 (e.g., a computer monitor to display aggregated insurance reports and/or results to an administrator).

The processor 810 also communicates with a storage device 830. The storage device 830 may comprise any appropriate information storage device, including combinations of magnetic storage devices (e.g., a hard disk drive), optical storage devices, and/or semiconductor memory devices. The storage device 830 stores a program 812 and/or scoring system 814 for controlling the processor 810. The processor 810 performs instructions of the programs 812, 814, and thereby operates in accordance with any of the embodiments described herein. For example, the processor 810 may receive telematics data from a vehicle. The processor 810 may also analyze the telematics data and/or transmit an underwriting decision for a potential entity to be insured based at least in part on a computed similarity score. Note that as used herein, the phrase "underwriting decision" may refer to any underwriting related decision (e.g., a decision as to pricing, whether or not to issue, etc.).

Referring again to FIG. 8, the programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the insurance platform 800 from another device; or (ii) a software application or module within the insurance platform 800 from another software application, module, or any other source.

In some embodiments (such as shown in FIG. 8), the storage device 830 stores an underwriting database 900 and/or a telematics and similarity database 860. An example of a database that may be used in connection with the insurance platform 800 will now be described in detail with respect to FIG. 9. Note that the database described herein is only one example, and additional and/or different information may be stored therein. Moreover, various databases might be split or combined in accordance with any of the embodiments described herein.

Figure 9:
FIG. 9 is a tabular portion of a trip similarity database in accordance with some embodiments.

Referring to FIG. 9, a table is shown that represents the underwriting database 900 that may be stored at the insurance platform 800 according to some embodiments. The table may include, for example, entries identifying users, drivers, or vehicles. The table may also define fields 902, 904, 906, 908, 910 for each of the entries. The fields 902, 904, 906, 908, 910 may, according to some embodiments, specify: a user identifier 902, a policy identifier 904, a trip similarity score 906, an applicable discount 908, and a current status 910. The information in the underwriting database 900 may be created and updated, for example, whenever data is received from remote vehicles.

The user identifier 902 may be, for example, a unique alphanumeric code identifying a customer or potential customer (e.g., a person or business). The policy identifier 904 might represent an insurance product that may be offered to the user associated with the user identifier 902. The trip similarity score 906 may be based on who frequently the user drives along similar routes or paths. According to some embodiments, the trip similarity score 906 might represent a grade or classification provided to the user (e.g., a "highly similar" classification). The applicable discount 908 might represent a percentage or dollar amount of discount that will be offered to the user based on his or her trip similarity score 906. The current status 910 may indicate whether or not the user has accepted the offer of insurance.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system for pricing an insurance premium based on vehicle trip similarities, the system comprising:
   a computer memory for storing data indicative of telematics data received from a sensor within a vehicle, the telematics data being associated with a plurality of trips and comprising at least one of geo-position information of the vehicle and vehicle kinematics data; and
   a processor in communication with the memory, wherein the processor is configured for:
   retrieving information related to an automobile insurance policy;
   retrieving at least a portion of the stored telematics data from the computer memory;
   computing a similarities score for routes traversed in the plurality of trips based on similarity of location data points along the routes traversed, determined from the retrieved telematics data;
   storing the computed similarities score;
   calculating a price adjustment for the insurance premium for the automobile insurance policy based on the retrieved information related to the policy and the similarities score;

applying the price adjustment to the insurance premium; and outputting the adjusted price for the insurance premium for the automobile insurance policy.

2. The system of claim 1, wherein said computing is based on at least one of: (i) a sequence alignment technique, (ii) a Smith-Waterman algorithm technique, and (iii) a Needleman-Wunsch algorithm technique.

3. The system of claim 2, wherein the technique used to compute the similarities score analyzes a plurality of route segments comprising each of the trips.

4. The system of claim 1, wherein said computing includes a removal process to remove duplicate information from the stored telematics data.

5. The system of claim 4, wherein the duplicate information that is removed is associated with a stationary vehicle.

6. The system of claim 1, wherein the data indicative of telematics data is received by an insurance company from a third party service.

7. The system of claim 1, wherein said computing is further associated with at least one of: (i) trip origins, and (ii) trip destinations.

8. The system of claim 1, wherein the processor is further configured for identifying safety events and determining, by the processor, a severity estimation of the safety events.

9. A system for pricing an insurance premium based on vehicle trip similarities, the system comprising:
a computer memory for storing telematics data received from a sensor within a vehicle, the telematics data being associated with a plurality of trips and comprising at least one of geo-position information of the vehicle and vehicle kinematics data; and
a processor in communication with the memory, wherein the processor is configured for:
computing a similarities score for routes traversed in the plurality of trips based on similarity of location data points along the routes traversed, determined from the telematics data received from the computer memory; and
determining a price, adjustment, or other benefit for automobile insurance for the driver based on the similarities score.

10. The system of claim 9, wherein the processor is further configured for:
automatically sending a notice of adjustment to the driver based on the determined price, price adjustment, or other benefit.

11. The system of claim 9, wherein the telematics data is associated with a sequence of latitude and longitude data pairs.

12. The system of claim 9, wherein the similarities score is further associated with at least one of: (i) multiple drivers, (ii) multiple vehicles, (iii) time of day information, (iv) day of week information, and (v) trip clusters.

13. The system of claim 9, wherein said determining is performed at least one of: (i) on an annual basis, and (ii) on a substantially real-time basis.

14. The system of claim 9, wherein said computing is based on at least one of: (i) a sequence alignment technique, (ii) a Smith-Waterman algorithm technique, and (iii) a Needleman-Wunsch algorithm technique.

15. The system of claim 9, wherein said computing includes a removal process to remove duplicate information from the stored telematics data.

16. The system of claim 9, wherein said computing is further associated with at least one of: (i) trip origins, and (ii) trip destinations.

17. The system of claim 9, wherein the processor is further configured for identifying safety events and determining, by the processor, a severity estimation of the safety events.

18. The system of claim 9, wherein determining the price for automobile insurance comprises determining a retroactive adjustment to be applied to a price of an automobile insurance premium for the period during which the telematics data was collected.

19. The system of claim 9, wherein determining the price for automobile insurance comprises determining an adjustment to be prospectively applied to a price of an automobile insurance premium for a future period.

20. The system of claim 9, wherein determining a price for automobile insurance comprises setting a price for a previously presented automobile insurance plan.

21. A method for pricing an insurance premium based on vehicle trip similarities, the method comprising:
receiving, by a processor, data indicative of telematics data collected from a sensor coupled to at least one vehicle during a plurality of trips, wherein the telematics data includes at least one of geo-position information and kinematics data;
computing, by the processor, a similarities score for routes traversed in the plurality of trips based on similarity of location data points along the routes traversed, determined from the telematics data; and
determining, by the processor, a price for automobile insurance for a driver based on the similarities score.

22. The method of claim 21, wherein said computing is based on at least one of: (i) a sequence alignment technique, (ii) a Smith-Waterman algorithm technique, and (iii) a Needleman-Wunsch algorithm technique.

23. The method of claim 21, wherein said computing includes a removal process to remove duplicate information from the stored telematics data.

24. The method of claim 21, wherein said computing is further associated with at least one of: (i) trip origins, and (ii) trip destinations.

25. A non-transitory computer readable medium having stored therein instructions for, upon execution, causing a computer to implement a method for pricing an insurance premium based on vehicle trip similarities, the method comprising:
receiving, by a processor, telematics data collected from a sensor coupled to a vehicle throughout a plurality of trips taken by the vehicle, wherein the telematics data includes at least one of geo-position information of the vehicle and vehicle kinematics data;
computing, by the processor, a similarities score for routes traversed in the plurality of trips based on similarity of location data points along the routes traversed, determined from the telematics data; and
determining, by the processor, a price for automobile insurance for a driver based on the similarities score.

26. The medium of claim 25, wherein said computing is based on at least one of: (i) a sequence alignment technique, (ii) a Smith-Waterman algorithm technique, and (iii) a Needleman-Wunsch algorithm technique.

27. The medium of claim 25, wherein said computing includes a removal process to remove duplicate information from the stored telematics data.

28. The medium of claim 25, wherein said computing is further associated with at least one of: (i) trip origins, and (ii) trip destinations.

29. The system of claim 1, wherein the computing the similarities score comprises:

determining a similarity value for each of a plurality of pairs of routes of the plurality of trips; and determining the similarities score based on the determined similarity values.

* * * * *